United States Patent [19]

Munski

[11] Patent Number: 4,660,785
[45] Date of Patent: Apr. 28, 1987

[54] HELICOPTER ANTITORQUE AUXILIARY PROPULSION SYSTEM

[76] Inventor: Michael S. Munski, 44052 Fine St., Lancaster, Calif. 93536

[21] Appl. No.: 809,295

[22] Filed: Dec. 16, 1985

[51] Int. Cl.$^4$ ............................................. B64C 27/82
[52] U.S. Cl. .................................. 244/17.19; 244/52
[58] Field of Search .................. 244/17.19, 23 B, 52, 244/7 A, 7 R, 8; 239/265, 265.27

[56] References Cited

U.S. PATENT DOCUMENTS

| | | | |
|---|---|---|---|
| 1,977,724 | 10/1934 | Hays | 244/17.17 |
| 2,738,147 | 3/1956 | Leech | 244/52 |
| 3,241,791 | 3/1966 | Piasecki | 244/17.19 |
| 3,401,886 | 9/1968 | Osborn | 244/52 |
| 3,432,119 | 3/1969 | Miller | 244/17.19 |
| 4,200,252 | 4/1980 | Logan et al. | 244/17.19 |

Primary Examiner—Joseph F. Peters, Jr.
Assistant Examiner—Rodney Corl
Attorney, Agent, or Firm—John J. Murphey

[57] ABSTRACT

Helicopter antitorque auxiliary propulsion system comprising a propeller attached to the tail boom adapted for powered rotation to create a directed air flow rearward of the helicopter, including a duct encircling the propeller and a pair of stabaron doors hingedly mounted in the ducted airstream to divert the air flow at high speed for directional control and to close at low speed and allow the air flow to be diverted through openings in the duct for directional and antitorque control.

13 Claims, 7 Drawing Figures

NOTE — ARROW INDICATES DIRECTION OF AIR FLOW

HELICOPTER ANTITORQUE AUXILIARY PROPULSION SYSTEM

BACKGROUND OF THE INVENTION

1. Field of the Invention

This invention relates to the field of heavier-than-air vehicles. More particularly, it relates to the field of hover craft vehicles, such as helicopters, and specifically relates to an improved propulsion and antitorque system therefore.

2. Description of the Prior Art

A helicopter is a heavier-than-air vehicle that can ascend and descend vertically, fly left and right and forward and backward as well as hover motionless in the air. It is generally comprised of a heavier-than-air body having spaced apart front and rear ends, usually termed the nose and the tail, a set of elongated blades of airfoil cross-section, termed main rotor blades extending generally radially in a horizontl plane from a rotor hub located on a rotor mast above the body and adapted to rotate in the generally horizontal plane, a motor or other power means to drive the mast and rotor blades in whirling rotation and develop vertical lift forces than can be applied to the body through the mast, and controls manipulated by the pilot to command it into the air and fly it controlled in virtually any direction. A tail boom extends from the rear part of the body and contains a second (smaller) set of tail rotor blades powered by an elongated drive shaft extending from the main transmission, (which receives power from the engine) along the tail boom to spin the tail rotor in a plane set at a right angle to the plane of the main rotor blades and generally vertical to the plane of the ground.

As the spinning main rotor blades provide vertical lift for the body, and a forward thrust vector of driving force when the plane of the blades is tilted downward toward the nose of the body, a sideways torque or "yaw" is generated that urges the body to rotate about the mast axis in the opposite direction of main rotor blade rotation. This yawing tendency also exists during hovering due to friction and loading in the drive system. The smaller set of tail rotor blades is powered to spin and counter this sideways torque. Depending upon whether the blades are on one side or the other of the tail boom to tail rotor is said to be of the "pusher" or the "puller" type.

The main rotor blades provide all the lift and all the forward thrust to the helicoptor. Because these force directions are at right angles to each other, they combine to develop a bending moment in the main rotor mast. This bending moment, called "mast bending" is generally a limiting factor to the forward speed of the helicopter; to go faster causes more bending in the mast as well as in the main rotor blades and, with any given body weight, exceeding the critical mast bening limit could result in catastrophic collapse of the mast or failure loading of the main rotor blades.

The prior art has attempted to add forward propulsion units to helicopters such as wing mounted, aft thrusting propellers and jets but these have not resulted in any degree of success because of fuel inefficiency and complexity of the propulsion configuration. In addition, these forward propulsion units cause undesirable vibration and stress fatigue in the fuselage or body structure.

SUMMARY OF THE INVENTION

This invention is a totally new propulsion and antitorque concept that can be built into new helicopters or retrofitted onto most existing helicopters. It comprises a novel "tail fan" or tail boom-mounted propeller that provides forward and rearward motion to the helicopter and takes the place of the conventional tail rotor assembly. It provides a unique directional antitorque control at the end of the tail boom with few moving parts. It is powered by the main engines through the main transmission. Its most novel feature is that it significantly reduces the forward thrust vector of the main rotor disc (plane of blade rotation) thus reducing the power load and the concomitant bending moments on the main rotor mast and blades. Thus a given weight and configuration of helicopter can be made to go faster by the addition of this invention because energy that once was translated into forward thrust power through the tilt of the main rotor blades, with the developing bending moments thereto, is caused to act directly on the helicopter at another point thereon and the main rotor is then freed of the limiting bending moments.

Along with the tail boom-mounted drive propeller is a duct or collar that encircles the propeller in the plane of rotation to concentrate the propeller's rearwardly directed air flow into a finite airstream to significantly improve thrust efficiency. The duct contains a pair of half-duct or half-circle doors, called "stabarons" that are hingedly mounted to swing apart and close the exhaust duct and swing open together to form a rudder that diverts and deflects the airstream to provide directional control to the helicopter at high forward speeds. The stabarons are also adapted to swing apart and close the duct to create an area of high pressure therein.

Apertures in the duct are manipulated by the pilot to open and close to exhaust some of this high pressure air and provide yaw control, roll control, and even pitch control to the helicopter. The conventional tail rotor is completely eliminated with this invention and in its place is a simple, rugged and heavily protected propulsion system that is free of the customary vibrations, potential for breaking and potential for causing personal injury of present-day exposed tail rotor assemblies.

Accordingly, the main object of this invention is a unique antitorque auxiliary propulsion system for helicopters that causes an improvement in forward speed by relieving the main rotor mast and blades of severe bending moment stress. Other objects include a propulsion system that eliminates the dangerous exposed tail rotor assembly, that reduces noise, that allows more speed to be reached at the same power load of conventional helicopters; that provides yaw, pitch and roll control by use of high pressure air at low speeds and during hovering, and by the use of stabaron doors and conventional horizontal and vertical stabilizers during high speed flight; that extends main rotor component fatigue life, that provides a propulsion system that is free of exposed rotor blades and that is shielded and protected against damage from hazards such as ground wires and tree limbs; and a propulsion system that may be placed on new helicopters and retrofitted on existing helicopters.

In the military versions of this invention, there is created an antitorque auxiliary propulsion system that is protected against damage from incoming weapons fire, a system with a significantly reduced radar silhouette, because of the shielding of the propeller by the duct, and a substantially reduced infrared signature, due to the greater mixing and accompanying cooling of engine exhaust by the tail boom propeller. Further, in all versions of this invention, there is added the ability to open the starbaron doors and taxi forward and reverse by reversing the pitch of the blades of the tail boom propeller so that wheel mounted helicopters with this invention would gain an added degree of flexibility at airports and air terminals heretofore unknown in the field. These and other objects of the invention will become more apparent upon reading the following Description of the Preferred Embodiment along with the Drawings attached hereto. The scope of the invention can be gleaned from a fair reading of the Claims that conclude this specification.

DESCRIPTION OF THE PREFERRED EMBODIMENT

Figure 1:
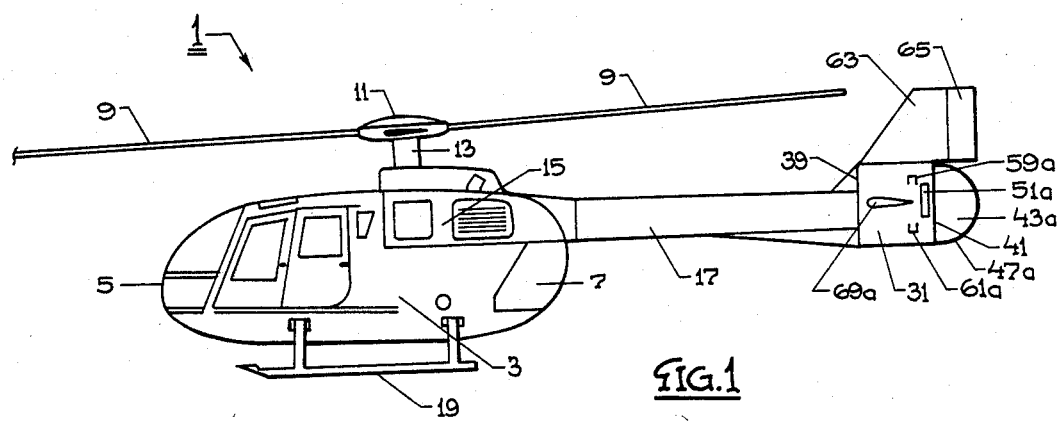
FIG. 1 is a side view of a typical helicopter showing one embodiment of the invention in the high forward speed configuration.

FIG. 1 shows a typical helicopter 1 comprising a heavier-than-air body 3 having spaced apart front end or nose 5 and rear end or tail 7. A set of rotors blades 9, having an air foil cross-section and being in numbers ranging from two upwards of five or seven, extend generally horizontally and radially from a hub 11 mounted atop a rotor mast 13 generally located above body 3. An engine (not shown) enclosed in an engine compartment 15 provides power to rotor mast 13 to cause rotor blades 9 to rotate in a plane such that the air foil cross-section passing through the air develops upward lift that is translated through blades 9, hub 11 and rotor mast 13 to lift body 3 into the air. A tail boom 17 extends axially to the rear of body 3 generally from rear end section 7 and, in conventional helicopters, terminates at a small set of tail rotors (not shown) whose plane of rotation is at right angles or normal to the plane of rotor blades 9. Body 3 is supported on the ground by a support structure 19 that may include wheels or skids.

Figure 3:
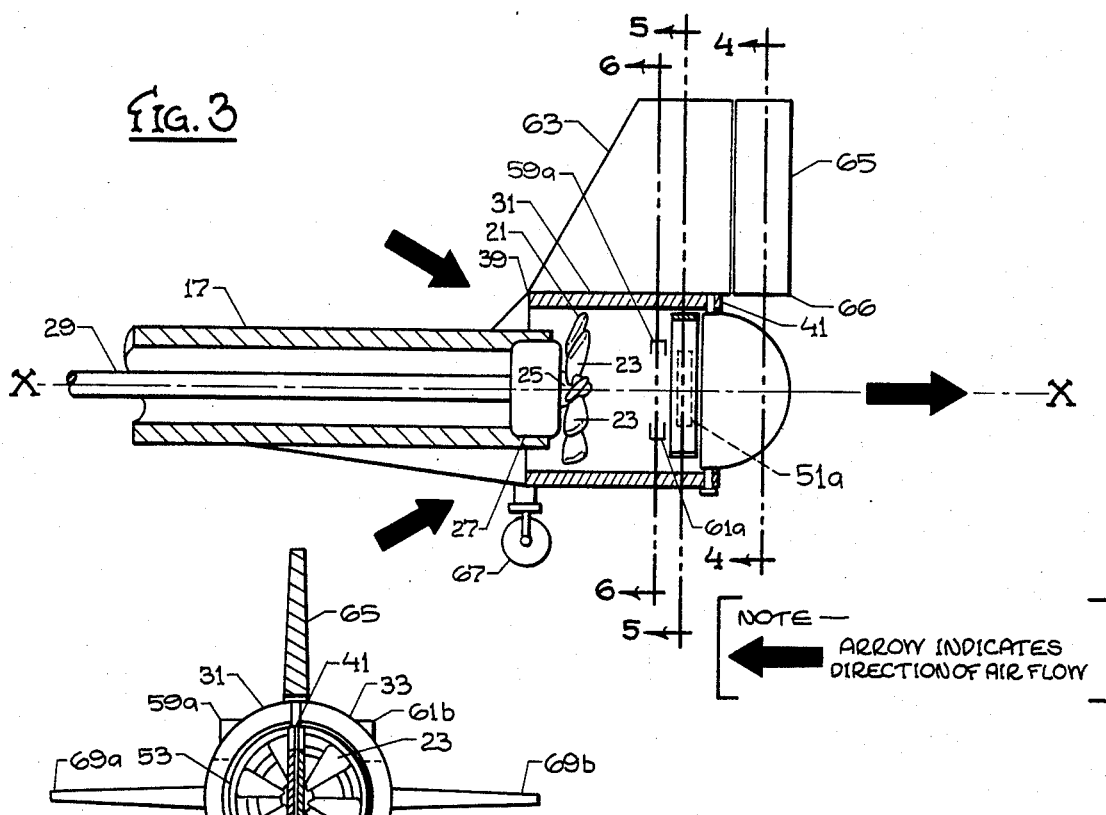
FIG. 3 shows in cross-section a side view of a typical embodiment of this invention.
Figure 4:
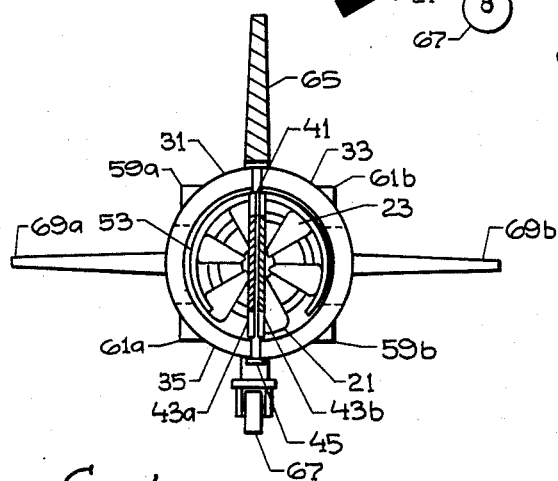
FIG. 4 shows a sectional end view of the invention taken along lines 4—4 in FIG. 3.

As shown in FIGS. 3 and 4, this invention comprises a propeller or fan 21 having a multiplicity of variable pitch blades 23 extending radially from a central propeller hub 25 that is attached to a constant speed propeller gearbox 27 that in turn receives power from a drive shaft 29 extending from the main power distribution gear box or main transmission carried forward of engine compartment 15 where drive shaft 29 is generally carried on top of or inside tail boom 17. Conventionally, and included in this invention, there is attached to the engine a power device called a "fuel control" to control power output from the engine to rotor mast 13 and drive shaft 29 automatically. Propeller blades 23 are desirably provided with reversible pitch so that, as will be explained hereinafter, the blades may be pitched to maximize their driving thrust to propel air rearward of tail boom 17, for high speed flight, pitched at smaller angles to generate moderate air pressure for roll, pitch and yaw control during low speed and hover conditions and reverse pitched to provide a forwardly directed air flow in the case of the helicopter diving in a nose-down attitude toward the earth so that this reverse air flow acts as a speed or dive brake. Ground taxi in forward or rearward directions may be achieved with this variable pitch propeller. The plane of rotation or spin of propeller 21 is normal to or at right angles to the axis of tail boom 17, generally shown in FIG. 3 as a dotted line x—x. The action of propeller 21 is to create a directed, high efficiency air flow that, in accordance with Newton's law of physics will impart a reactionary motion to helicopter 1.

A duct or collar 31 is provided around and spaced apart from the tips of propeller blades 23 such as to encircle propeller 21 in its plane of rotation. Duct 31 provides a complete enclosure containing spaced-apart top and bottom portions 33 and 35 respectively joined by a pair of mutually opposed first and second side portions 37a and 37b to form a contiguous enclosure. Duct 31 spans a distance fore and aft of propeller 21 beginning at a forward end 39 and extending aft beyond propeller blades 23 to terminate at an aft end 41. One of the chief functions of duct 31 is to concentrate the general rearwardly direct air flow created by propeller 21 into a finite and, as hereinafter more fully explained, controllable air stream.

A pair of semicircular doors 43a and 43b are hingedly connected to duct aft end 41 by an elongated hinge pin 45 that spans duct top 33 and duct bottom 35. Doors 43a and 43b are defined by a semicircular outer edge 47a and 47b and an inner straight edge 49a and 49b and are arranged such that when swung completely apart to reside in a common plane, outer edges 49a and 49b make full contact with duct 31 and completely close it off. When swung together, they fold into a unitary mutually adjacent sandwich shape (see FIG. 4) for use as a rudder in the rearwardly ducted controlled air stream. These doors have been named by the inventor as "stabaron" doors because, as will hereinafter be seen, they include the functions of stability and directional control surfaces collectively. During high speed forward flight, the finite air stream produced by propeller 21 drives helicopter 1 in a forward direction. Under these conditions, stabaron doors 43a and 43b are commanded open by the pilot such that they meet at the center of duct aft end 41. Under control by the pilot, they thereafter move in unison within this airstream as a rudder to provide directional flight control. By turning joined stabaron doors 43a and 43b to the left, the air stream is deflected left of axis x—x of tail boom 17 and deflects tail boom 17 to the right thus rotating helicopter body 3 to the left. By turning stabaron doors 43a and 43b in the opposite direction, the opposite effect will be achieved. The operation of stabaron doors 43a and 43b is accomplished with electric or hydraulic actuators as is already known in the helicopter art. The specific types of actuators are not shown here for clearity but are considered to be part of the prior art.

Figure 5:
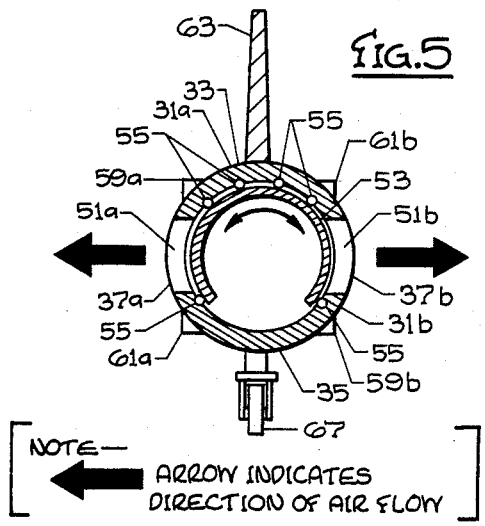
FIG. 5 shows another sectional end view of the invention taken along lines 5—5 in FIG. 3 showing the control ring for operation of the yaw apertures and omitting the propeller.

A first pair of yaw apertures or slots 51a and 51b are provided respectively, one in first duct side 37a and one in second duct side 37b. Slots 51a and 51b extend generally outward through first and second duct sides 37a and 37b and may be of many different configurations. As shown in FIG. 3 and 5, said slots 51a and 51b are arranged in a vertical direction equidistant above and below the midpoint of duct 31.

Said yaw apertures 51a and 51b are adapted to alternately open and exhaust a portion of the pressurized air that is generated within duct 31 by having stabaron doors 43a and 43b closed by pilot command or the automatic function of the electronic flight director (which receives inputs of airspeed, main rotor RPM, collective and cyclic control positions and throttle position). The high pressure air generated in closed-off duct 31 is adapted to be exhausted either through one or the other of yaw apertures 51a and 51b to provide for a developed reactionary force applied against duct 31, and concomitantly, tail boom 17, to yaw helicopter body 3 in the desired direction during low speed flight conditions or during hovering. It is believed that this function of yaw apertures 51a al and 51b will become prime means of directional control to the helicopter at forward air speeds of 60 knots or less. Under high speed flight conditions, generally greater than 60 knots, both yaw apertures 51a and 51b are commanded closed and the opened and joined-together stabaron doors 43a and 43b take over the aircraft directional control from said yaw apertures.

Said yaw apertures 51a and 51b are opened and closed by pilot command or flight director control through action of a control ring 53 mounted inside duct 31, in sliding engagement therewith by virtue of a set of bearings 55, and extending around the upper portion of duct 31, terminating below yaw apertures 51a and 51b when centered therein. In normaly, centered position, ring 53 extends below and shuts off yaw apertures 51a and 51b. When commanded by the pilot to yaw tail boom 17 to the right, the pilot causes ring 53 to be actuated to rotate clockwise, as shown in FIG. 5, and open aperture 51a. For opposite yaw of tail boom 17, the pilot causes ring 53 to rotate counter clockwise to open yaw aperture 51b.

Figure 6:
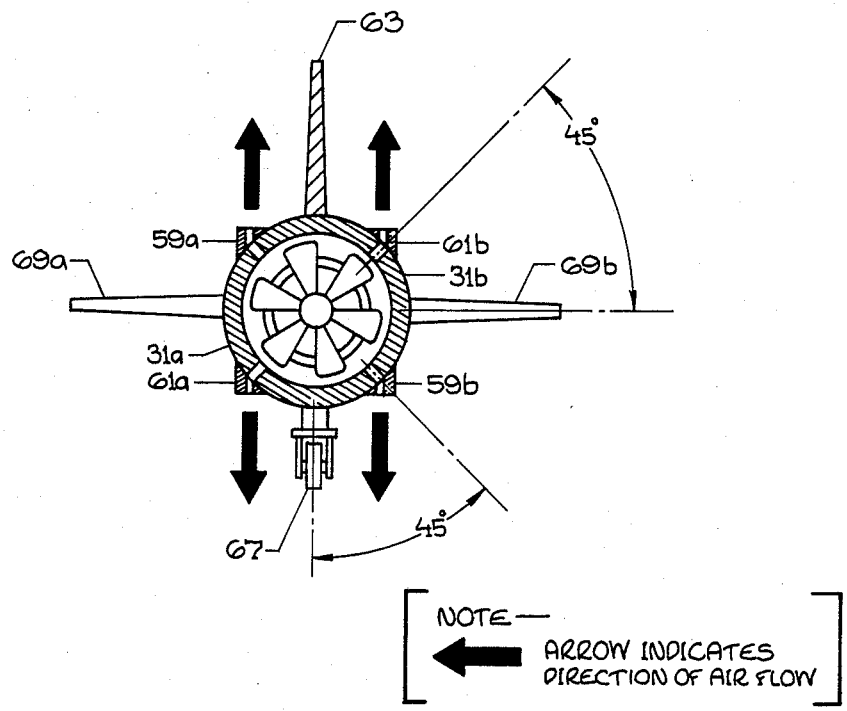
FIG. 6 shows another sectional end view of the invention taken along lines 6—6 in FIG. 3 showing the location of the anticoupling apertures for pitch and roll control established in this embodiment.

To counteract roll coupling forces developed between tail boom axis x—x and the main rotor blades plane of rotation, a second pair of anticoupling nozzled apertures 59a and 59b are provided outwardly through first and second duct sides 31a and 31b, nozzled aperture 59a lying above and forward of yaw aperture 51a on first duct side 31a and directed vertically upward and nozzled aperture 59b lying below and forward of yaw aperture 51b on said second duct side 31b and directed vertically downward. A third pair of anticoupling nozzles apertures 61a and 61b are provided outwardly through first and second duct sides 37a and 37b, nozzled aperture 61a lying below and forward of said yaw aperture 51a on first duct side 37a and directed vertically downward and aperture 61b lying above and forward of yaw aperture 51b on said second duct side 37b and directed vertically upward. As can be seen in FIG. 6, a counterclockwise rotational moment around tail boom axis x—x is generated by opening antiroll apertures 59a and 59b, such that the pressurized air in duct 31 expelled through said vertically aimed apertures generates a torque and subsequent rolling moment. The use of apertures 61a and 61b provides for torque in the opposite or clockwise direction. By opening apertures 59a and 61b (both being above yaw apertures 51a and 51b) duct 31 and boom 17 are urged downward by the reactionary force generated thereby and thus these two apertures, working in unison, can augment other pitch attitude controls. Similarly, by opening apertures 61a and 59b will develop an upwardly directed reactionary force to push tall boom 17 upward and lower the nose of helicopter 1.

Figure 2:
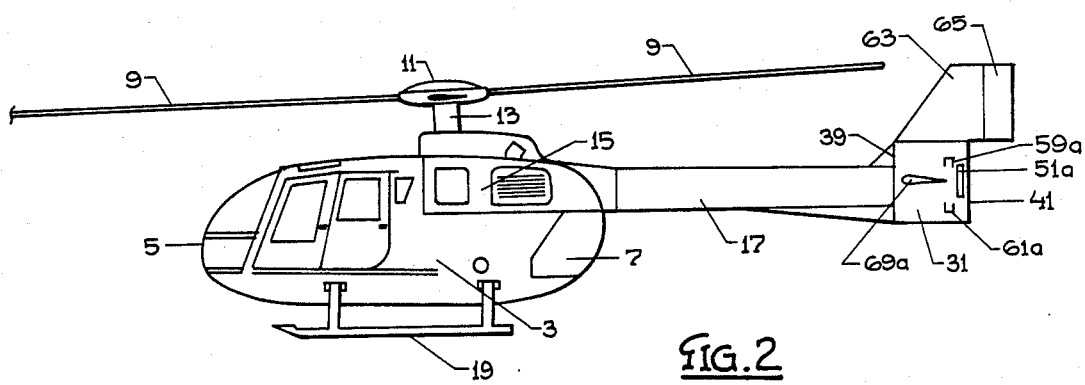
FIG. 2 shows the same view as FIG. 1 except that the invention is shown in the low forward speed and hovering configuration.

Extending generally vertically above duct top 33 is a vertical stabilizer 63 containing conventional rudder control surfaces 65 that provide additional directional control to the helicopter under high speed flight conditions. It is desired that trailing edge 66 of said stabilizer extends aft of duct aft end 41 a distance of one radius of stabaron door 43 to reduce air flow drag about duct 31. In some helicopters wherein tail boom 17 extends from body rear end section 7 lower to the ground than is shown in FIGS. 1 and 2, a lower vertical stabilizer will depend from duct bottom 35 and may contain a rudder control surface similar to surface 65. Further, other helicopters having a lower tail boom position and utilizing this invention would necessitate a tail wheel, such as shown at 67 in FIG. 3, depending either from duct bottom 35 or from the lower vertical stabilizer depending therefrom to provide protection to duct 35 and propeller 21 contained therein during landing and providing taxi capability. In addition, a pair of horizontal stabilizers 69a and 69b are shown extending outwardly from first and second ducts sides 37a and 37b to augment pitch attitude control to helicopter 1 during high speed flight conditions or roll attitude control when used as elevons.

A unique feature of this invention is found in a high speed dive of helicopter 1. By opening stabaron doors 43a and 43b and reversing the pitch of propeller 21, a forwardly directed air stream is produced that acts as a speed or dive brake to helicopter 1, a feature and capability not available in current conventional helicopter design.

By the operation of this invention, to provide high speed forward propulsion to helicopter 1, a significant load is removed from main rotor blades 9 and thus reducing the main rotor mast 13 bending moment. Accordingly, a helicopter retrofitted with this invention can reach higher forward air speeds because the main rotor is relieved of a limiting restraint i.e., the blade and mast bending moments, and the main rotor blades thereafter act only to raise and lower the helicopter and provide forward motion at low speeds e.g., in the zero to sixty knot air speed range. In essence, the same bending moment achieved on main rotor mast 13 at a forward speed of 60 knots will be substantially and comparatively reduced under high speed flight imposed by the use of this invention and will not significantly increase until speeds below 60 knots are encountered at which point the bending moment will begin to decay.

Figure 7:
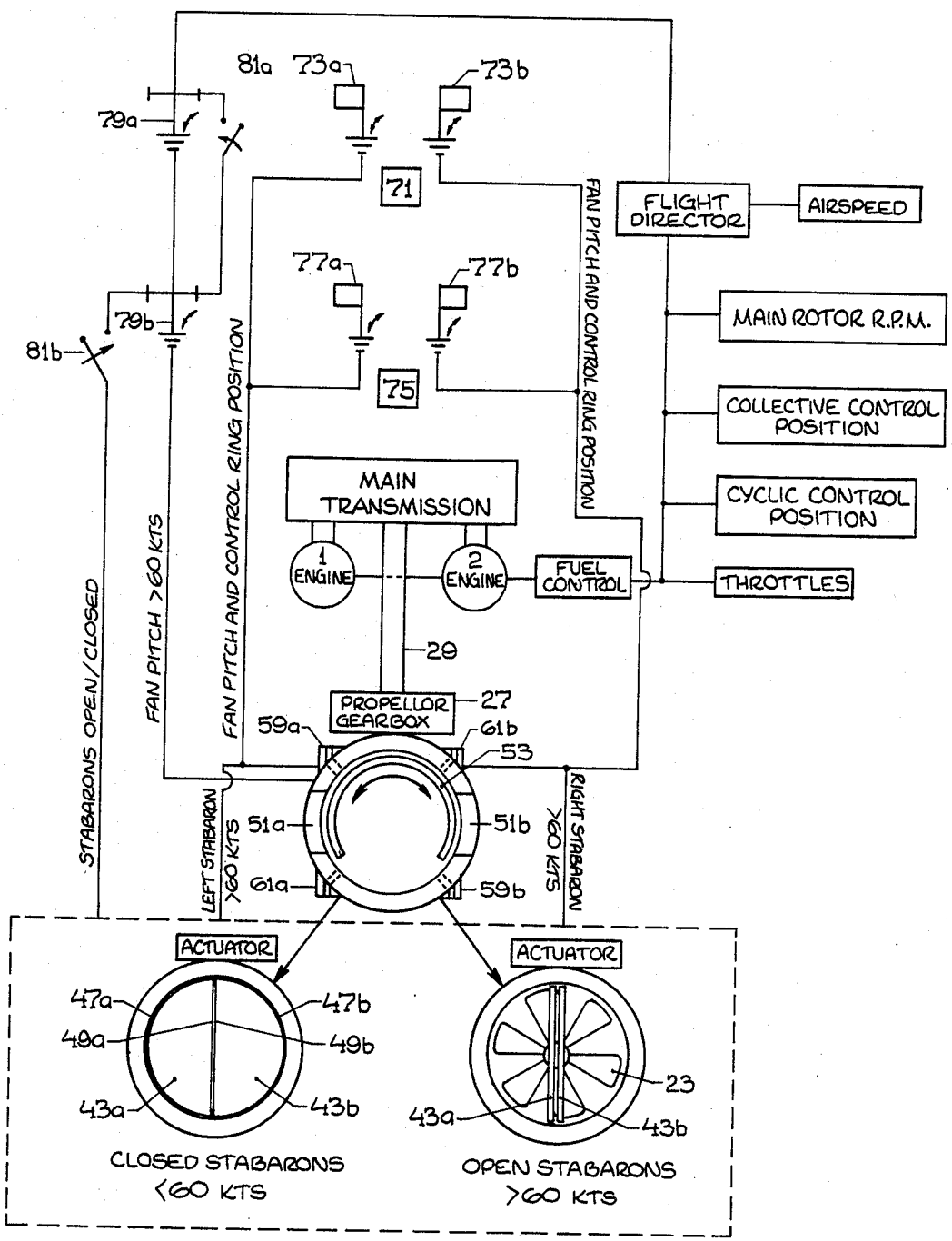
FIG. 7 shows a schematic diagram of the control system configuration for the pilot and the co-pilot in the operation of the invention for all types of flight conditions.

As shown in FIG. 7, the pilot and co-pilot of a helicopter using this invention will be provided with one additional control than currently exists in conventional helicopters. The pilot is positioned at 71 having his feet resting on a pair of left and right pedals 73a and 73b. The co-pilot sits next to or, as shown, behind or to the rear of the pilot at 75 and has his feet on a pair of similar pedals 77a and 77b. Each pilot has a control "T" on the left console shown at 79a and 79b. A switch 81a and 81b is located on respective "T's" 79a and 79b and operates to command stabaron doors 43a and 43b to close over the end of duct 31 or open into the aforesaid sandwiched configuration for high speed rudder control. In hover and at speeds below sixty knots, said pedals 73a, 73b, 77a and 77b control the position of ring 53 to open and close yaw apertures 51a and 51b. Also interconnected therewith is the pitch of propeller blades 23. As the pilot commands one of the yaw apertures open, by position of the pedals, there occurs an immediate decrease in air pressure in closed duct 31 and the pitch of blades 23 is automatically changed or increased to reestablish the air pressure therein as a function of pedal position. During these conditions, T 79a and 79b have no control over propeller blade pitch. As speed approaches sixty knots, the pilot commands the closed stabaron doors 43a and 43b to open by activating switch 81 on T 79a or 79b. This immediately transfers full control of the propeller blade pitch into T 79 and locks blade pitch control out of the pedals. Simultaneously, pedals 73a, 73b, 77a and 77b now become the control for folded-together stabaron doors 43a and 43b. The pilot now has rudder control in the pedals, power (fan blade pitch) control in the T and the standard collective and cyclic controls that are conventionally used in the helicopter. The function of the anticoupling nozzles are automatic and provide supplemental low speed roll and pitch stabilization to augment the primary flight controls.

As can be seen from the construction of this invention, there is little outside view of propeller 21 because duct 31 and stabaron doors 43a and 43b obscure a direct view. Comparing this configuration to that of the conventional helicopter (having an exposed tail rotor) a significant reduction in the radar silhouette and detectability can be expected. Furthermore, the normal hot jet turbine exhaust coming from engine compartment 15 is quickly mixed with fresh air drawn into propeller 21 to dilute the heat content and lower the temperature thereof thus reducing the infrared signature of the helicopter to air-to-air and ground-to-air infrared homing missile seekers. Thus, reduced radar detectability and low infrared signature are inherent design characteristics of this invention.

What is claimed is:

1. An antitorque auxiliary propulsion system for helicopters of the type having a tail boom extending axially therefrom comprising:
   (a) a propeller for attachment to said tail boom adapted for powered rotation to create a directed air flow to impart reactionary motion to said helicopter;
   (b) a duct encircling said propeller in its plane of rotation and comprising integrally connected top, bottom and first and second side portions thereof to concentrate said air flow into a finite air stream;
   (c) a pair of vertically oriented stabaron doors hingedly mounted in said ducted air stream adapted to move from a position that fully closes off said duct and the air stream therethrough to a position that fully opens said duct;
   (d) a first pair of yaw apertures formed in said duct and extending generally horizontally outward through said first and second sides thereof; and,
   (e) means to control the position of said stabaron doors to
      (i) close off said duct and the air stream therethrough and selectively divert the air stream sideways through one of said yaw apertures to impart directional and antitorque control to said helicopter under low speed and hovering flight conditions, and
      (ii) open said duct and, thereafter in unison, divert said air stream from its normal rearward course to impart directional control to said helicopter under high speed flight conditions.

2. The antitorque auxiliary propulsion system of claim 1 wherein said propeller is arranged for axial rotation about the axis of said tail boom.

3. The antitorque auxiliary propulsion system of claim 1 wherein said propeller includes a propeller gearbox of constant speed drive.

4. The antitorque auxiliary propulsion system of claim 1 wherein said propeller is adapted for varible and reversible blade pitch control.

5. The antitorque auxiliary propulsion system of claim 1 wherein said stabaron doors are adapted to swing from a position completely shutting off said airstream duct to a full open, mutually adjacent 'sandwich' position and thereafter move in unison within said airstream as a rudder to provide directional flight control characteristics to said helicopter under high speed flight conditions.

6. The antitorque auxiliary propulsion system of claim 1 further including vertical and horizontal stabilizers containing control surfaces extending outward from said duct for stabilization and control of said helicopter during high speed flight and maneuvers.

7. The antitorque auxiliary propulsion system of claim 1 further including a tail wheel depending below said duct to protect said antitorque auxiliary propulsion system during landing and take off of said helicopter and provide ground taxi capability.

8. The antitorque auxiliary propulsion system of claim 1 further including a control ring slidingly covering said first pair of yaw apertures and adapted to uncover only one of said apertures at a time, upon command, to impart directional control to said helicopter.

9. The antitorque auxiliary propulsion system of claim 1 wherein said duct has a second pair of apertures formed outward through the sides thereof, one above said yaw aperture on said first side of said duct directed upward and the other below said yaw aperture on said second side of said duct directed downward and a third pair of apertures formed outward through the sides thereof, one below said yaw aperture on said first side of said duct directed downward and the other above and said yaw aperture on said second side of said duct directed upward, said second and third pairs of apertures adapted to alternately open and close, upon command, to pass a portion of said airstream therethrough to generate anticoupling roll forces about said boom and to open in alternate pairs to provide vertically upward and downward pitch forces on said tail boom.

10. The antitorque auxiliary propulsion system of claim 9 wherein said stabaron doors are adapted to close off said duct to produce high pressure air therewithin for partial exhaustion selectively through said yaw apertures and said anticoupling apertures in said duct for yaw, roll and pitch attitude control of said helicopter under low speed and hovering flight conditions.

11. An antitorque auxiliary propulsion system for helicopters of the type having a tail boom extending axially therefrom comprising:
   (a) a propeller for attachment to said tail boom, having variable and reversible blade pitch and driven by said power means through a variable power constant speed device, adapted to spin in a plane generally transverse to the axis of said tail boom to create a rearwardly or forwardly directed airflow to impart reactionary motion to said helicopter;

(b) a duct encircling said propeller and having contiguous top, bottom and first and second side portions thereof to concentrate said airflow into a finite air stream, and including:

(i) a first pair of yaw apertures formed therein extending outward through the sides thereof and adapted to alternately open and close to pass a portion of said airstream therethrough to impart sideways reactionary directional forces on said tail boom; and, (ii) a ring slidingly mounted in said duct, arranged to cover both said yaw apertures under high speed flight conditions, and to uncover only one aperture at a time under low speed and hovering flight conditions to exhaust air therethrough and impart sideways reactionary directional forces on said boom;

(c) a pair of vertically oriented stabaron doors hingedly mounted in said airstream, across said duct, adapted to swing into a single plane and close off said duct to product high pressure air therewithin for partial exhaustion selectively through said yaw apertures, under low speed and hovering flight conditions, and to swing together to a full open contiguous position and thereafter move in unison within said airstream as a rudder to provide directional flight control characteristics to said helicopter under high speed flight conditions; and, (d) means to vary the power delivered to the pitch and the speed of the propeller, the position of said ring in said duct and the position of said stabaron doors to provide coordinated maneuvering to said helicopter under all flight and hovering conditions.

12. The antitorque auxiliary propulsion system of claim 11 including a second pair of apertures formed outward through said side portions of said duct, one above said yaw aperture on said first side of said duct directed upward and the other below said yaw aperture on said second side of said duct directed downward, and a third pair of apertures formed outward through said side portions of said duct, one below said yaw aperture on said first side of said duct directed downward and the other above said yaw aperture on said second side of said duct directed upward, said second and third pairs of apertures adapted to alternately open and close, upon command, to pass a portion of said high pressure air therethrough to impart anticoupling forces and pitch about said tail boom.

13. The antitorque auxiliary propulsion system of claim 11 further including a tail wheel depending from said bottom portion of said duct to provide support and protection for said auxiliary propulsion system during landing and take off maneuvers and to provide ground taxi capability.

* * * * *